Dec. 8, 1953 F. P. GOLDBACH 2,661,903
NAVIGATION COUNTER
Filed Feb. 4, 1950 2 Sheets-Sheet 1
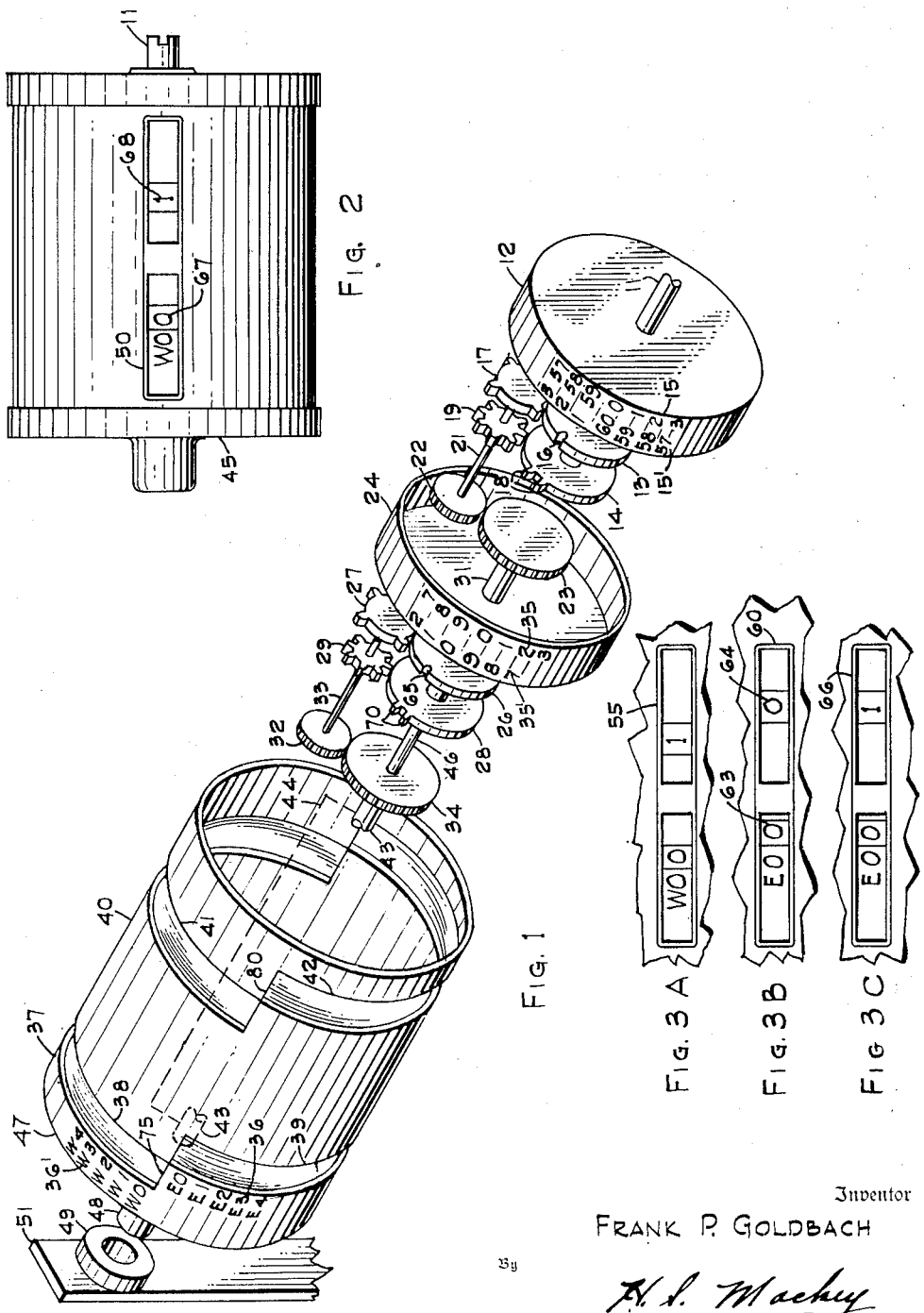
Inventor
FRANK P. GOLDBACH
By
H. L. Mackey
Attorney Dec. 8, 1953          F. P. GOLDBACH           2,661,903
                      NAVIGATION COUNTER
Filed Feb. 4, 1950                          2 Sheets-Sheet 2

Inventor
FRANK P. GOLDBACH
*N. S. Mackey*
Attorney

Patented Dec. 8, 1953

2,661,903

UNITED STATES PATENT OFFICE 2,661,903

NAVIGATION COUNTER

Frank P. Goldbach, Pleasantville, N. Y., assignor to General Precision Laboratory Incorporated, a corporation of New York Application February 4, 1950, Serial No. 142,476

7 Claims. (Cl. 235—117)

1

This invention pertains to navigation counters and more particularly to mechanical counters for indicating latitude, longitude and other angular units of measure wherein a given input quantity is represented by changing scale values which may decrease for a time and then increase or vice versa while the input quantity varies continuously in the same sense.

Consider an indication of longitude as an example and assume that the longitude of a vessel sailing from New York in a generally easterly direction through the Mediterranean is to be continuously indicated by suitable actuation of a counter rotated with the speed and direction of travel of the vessel. Under such circumstances the indication of longitude as the vessel leaves New York and proceeds eastward will first decrease from approximately 74° west longitude to 0° at a point slightly beyond Iran. At this point further travel in the same easterly direction towards the Eastern Mediterranean results in a continuous increase in east longitude, the prime meridian having been passed. Any counter or other indicator which is to continuously indicate the instantaneous longitudinal position of the vessel must have indicia scales which continuously decrease in numerical value to a selected point, zero in this case, and which thereafter increase while the counter itself is continuously revolved in a single direction. Of course the converse is equally true, that is in crossing the 180° meridian the scale values must increase to the selected numerical value of 180° and thereafter decrease.

In the past mechanical counters have been proposed which accomplish the conversion from decreasing scale indications to increasing scale indications and vice versa but such devices have been relatively complicated utilizing two sets of counter wheels and instantaneously actuated shutters operating at the 0 and 180° points to alternately obscure and reveal the scales of the separate counter wheel sets. Such a mechanism is relatively complicated and expensive and also requires the application of additional energy at the periodic intervals of shutter actuation which extra energy may not always be available at these critical times, thus producing inaccurate operation.

In the instant invention the desired results are obtained by appropriate design of the several scales, together with a novel masking arrangement attached to and made a part of one of the scale bearing members. Briefly, the slowest-moving of the several ranks or stages

2 of the counter carries a scale and in addition has an elongated portion extending over the remaining stages so designed as selectively to control the visibility of the scales carried by all stages of the counter. Each stage is provided with scales duplicated in reverse, and the elongated portion of the slowest-moving stage is provided with opaque and transparent areas such that all increasing scales are concealed while all decreasing scales are revealed for a portion of the revolution of the slowest-moving stage while during the remainder of its revolution all increasing scales are revealed and the decreasing scales concealed.

Using the example referred to above, the input applied to the counter of the instant invention takes the form of a shaft rotation so geared to the counter as to result in correct indications of longitude at all times. During the first portion of the trip the indications of longitude progressively decrease until as stated the prime meridian is reached and crossed at which time the indications of longitude must be shifted to a numerically increasing scale. In the instant invention the elongated portion of the slowest-moving stage acts as a mask for selected ones of the scales provided on the remainder of stages, the transparent and opaque portions having such relative configuration that the decreasing scales are visible until the prime meridian is reached after which the decreasing scales are concealed and the increasing scales are rendered visible. At the 180° meridian a reverse action takes place and the mask so coacts with the scales that the decreasing scales are revealed while the increasing scales are concealed.

The instant invention may obviously be applied to the usual forms of mechanical counters. In particular it is adaptable to those forms employing several stages each having a short cylinder bearing numbers around its external curved surface each stage of which is indexed by the previous stage. The several cylinders or stages are positioned adjacent and coaxial and a surrounding case having an axial window or slot conceals all of the numbers of all cylinders except those under the slot. The invention is also adaptable to those forms of counter in which a disc is composed of concentric flat rings, each bearing one increasing and one decreasing scale constituting a separate numerical rank, the whole being provided with slotted cover which reveals only one number at a time of each rank.

Further understanding of the invention may

3 be had by reference to the detailed description taken together with the drawings, in which:

Figure 1 is an expanded view of the operating mechanism of one form of the invention utilizing indicia of longitude.

Figure 2 is a front view of the completely assembled counter of the invention illustrating the manner in which only the proper indicia are revealed through the window in the counter case.

Figures 3A, 3B and 3C are illustrations of the indicia as they appear in the casing window at periods just prior to, at and after crossing the prime meridian.

Figure 5:
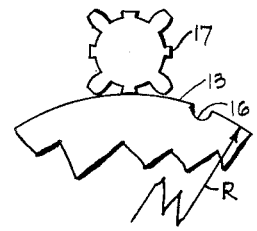
Figure 5 is a plan view of the locking ring and pinion of Fig. 1 showing their interoperating relationship.
Figure 6:
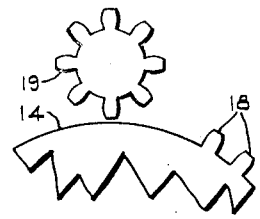
Figure 6 is a plan view of the escapement gear and escapement pinion of Fig. 1 showing their interoperating relationship.

Referring now to Fig. 1, a shaft 11 receives longitude indications from any source in the form of angular displacements. To the shaft there are secured a drum dial 12, a locking ring 13, and an escapement gear 14, so that all turn with the shaft. The drum dial is provided with two scales 15 and 15' representing minutes of angular measure on its curved surface. One scale 15 is composed of indicia the numerical value of which increases in a counterclockwise direction so that if the drum 12 is turned clockwise by the shaft 11 the indicia presented to an observer will increase in numerical value. The other scale is composed of indicia the numerical value of which increases in the opposite direction around the drum so that as the drum is rotated clockwise the indicia presented to the observer by this scale decrease in numerical value. The locking ring 13 consists of a disc having a single indentation 16 in its edge, and is designed to match a four-tooth locking pinion 17. The pinion 17 is positioned closely adjacent the locking ring 13 so that two of its teeth bear on the edge of the locking ring 13, in general preventing the locking pinion 17 from rotating as illustrated in Fig. 5. When, however, the locking ring turns to the point where one of the locking pinion teeth may fall into the indentation 16, the pinion is thereby unlocked and is no longer prevented from turning. The escapement gear 14, Fig. 1, carries two projecting teeth 18 designed to mesh with an eight-tooth escapement pinion 19 that is positioned adjacent the gear as illustrated in greater detail in Fig. 6. The escapement pinion 19 and locking pinion 17 are both secured to the same jackshaft 21, Fig. 1, and the indentation 16 in the locking ring 13 is aligned with the space between the teeth 18 of the escapement gear 14. Thus at the same time the pinion 17 is unlocked, the teeth 18 produce a partial rotation of the gear 19 and jackshaft 21. The jackshaft 21 is also secured to a pinion 22 meshing with a gear 23, the teeth thereof being indicated but not shown.

The drum dial 12, locking ring 13 and its pinion 17, and escapement gear 14 with its pinion 19 constitute the first and fastest-moving stage of a mechanical counter here termed the minutes stage. The drum dial with the locking ring and escapement gear are driven steadily by the shaft

4

11, and once per revolution the teeth 18 engage the pinion 19 to advance it a fraction of a revolution while the locking pinion 17 is unlocked. Thereafter the locking pinion is again locked by the locking ring 13. The fractional advancement of the pinions and of the jackshaft 21 advances the pinion 22 which in turn advances the gear 23 a proportional amount which in this example is designed to be one-tenth turn.

The second-stage of the counter, here termed the degrees stage, is similar to the first, being different only in the manner of driving and in the scales carried by it. The second stage consists of the driving gear 23, a drum dial 24, a locking ring 26, a matching locking pinion 27, an escapement gear 28 and a matching escapement pinion 29. The driving gear 23, drum dial 24, locking ring 26 and escapement gear 28 are all secured to a single shaft 31 so that all are directly driven by the driving gear 23, and the pinions 27 and 29 together with a driven pinion 32 are all secured to a jackshaft 33 so that they turn together. The drum dial 24 carries two scales 35 and 35', each representing degrees from zero to nine inclusive. The scale 35 consists of indicia which numerically increase in a counterclockwise direction so that clockwise rotation of the gear 23 causes the numerical value of the indicia to appear to increase to the observer. The other scale 35' has its indicia numerically increasing in the opposite direction. The operation of the locking ring and pinion, with the escapement gear and its pinion is such that the pinion 32 is advanced by a fractional turn for each single complete revolution of the driving gear 23 in the manner described for the preceding stage. The rotation of the pinion 32 advances a meshing gear 34 by a proportionate amount which is in this example one thirty-sixth turn for every revolution of the gear 23.

The third and slowest moving stage consists of a drum 37 on which two scales 36 and 36' are inscribed reading in tens of degrees. The two scales are offset axially with respect to each other and each occupies half the circumference of the drum 37, the scale 36 increasing numerically in a counterclockwise direction around one-half the surface of the drum, while the scale 36' increases numerically in the opposite or clockwise direction around the other half of the drum.

The drum 37 is secured to a shaft 43 on which the driving gear 34 is mounted, the driving gear meshing with the gear 32 affixed to the jackshaft 33 so that the drum 37 is periodically advanced once each complete revolution of the drum 24.

Aside from constituting an indicia bearing member acting to periodically position the proper indicia to the view of the observer as in the case of the first and second stages, the third stage also acts as a masking member to conceal one or the other of the scales of the first two stages while at the same time revealing the proper increasing or decreasing scale of each pair. To this end the drum 37 is provided with an elongated skirt 40 of slightly larger internal diameter than the external diameter of the drums 12 and 24 so that in assembled position the drums 12 and 24 are completely surrounded and covered by the skirt 40. The skirt 40 is made opaque except for two pairs of offset slots 38, 39 and 41, 42 each of which extends halfway around the circumference of the skirt 40. Since it is preferable that each pair of transparent slots be contiguous at diametrically opposite points, the skirt 40 may be made of transparent plastic having all but the portions occupied by the slots 38, 39, 41 and 42 rendered opaque by a suitable coating thus constituting a single unitary member.

The shaft 43 that is shown in Fig. 1 attached to the driving gear 34 and also to the end 47 of the dial drum and mask 37 is broken for clarity, so that the gear 34 can be depicted outside the cylinder 37 and the two portions of the shaft 43 are indicated by the broken line 44 as being one shaft. Also all parts of the first and second stages are depicted outside the cylinder 37 for clarity, although actually they are inside the cylinder 37, with the driving shaft 11 protruding. The second stage is supported by and rotates loosely on the small axial shaft 46, although driven independently thereof. The jackshafts 21 and 33 are supported in the positions shown in Fig. 1 by framework that is omitted for greater clarity. The third stage including the drum 37, the axial shaft 43, and all other parts of the counter are supported by the end piece 47 of the third stage drum dial and a stub shaft 48 secured thereto. This shaft 48 is journaled in a sleeve bearing 49 fastened to the supporting frame or case that is represented by a strip 51.

The rotating drum 37 shown in Fig. 1 and all parts therein are housed in and supported by a stationary case 45, Fig. 2, having a longitudinal window 50 through which one number at a time of each rank is visible. Behind this window is disclosed the letter and number W 0, intended to represent the lowermost indicium of the scale 36′, Fig. 1. There is also disclosed a second zero at the reference character 67 intended to represent the zero of the scale 35′ of the drum dial 24, which is the units digit of the number representing degrees. There is also disclosed in the window the numeral at the reference character 68 representing that numeral on the scale 15′ of the drum dial 12, Fig. 1. These numerals shown in the window 50 thus are the numerals which would be displayed by the counter in the angular position drawn in Fig. 1 through a window positioned just above the slot offsetting lines, and seen through the slots 38 and 41.

The longitude of W 00° 1′ referred to above and shown in Fig. 1 by the indicia just above the slot offsetting lines is also shown in Figs. 2 and 3A. If the counter of this invention is installed in a ship travelling eastward this indication appears when the ship arrives in the vicinity of Iran as it travels eastward in the Mediterranean Sea.

When the ship referred to has travelled further toward the east by one minute of longitude it will have arrived at the prime meridian of Greenwich, and the counter should indicate zero longitude. In arriving at this reading the counter advances each of its three stages by one unit, and at the same time transfers the display of each of its three stages from one scale to the other thereof. The means by which this result is accomplished and the action thereof are particularly important in attaining the purposes of this invention, and are described as follows.

When the drum dials depicted in Fig. 1 have reached the positions shown therein all of the stages of the counter have attained such positions that the advancement of the first stage dial 12 by one additional unit through further clockwise rotation of the input shaft 11 will result also in the advancement of the second stage drum dial 24 by one additional unit thereof which in turn will result in the advancement of the third stage drum dial cylinder 37 by one additional unit thereof. The notches and teeth of the locking rings 13 and 26 and escapement gears 14 and 28 have purposely been shown somewhat separate from imminent contact with their respective pinions 17, 27, 19 and 29 for clarity, but in considering the instant stage advancements it is to be considered that the notch 16 of the locking ring 13 is so close to its matching pinion 17 that an additional and further clockwise rotation of the driving shaft 11 to advance the drum dial 12 by one unit or position of the scales 15 and 15′ will release the hitherto locked pinion 17. Similarly it is to be considered that the teeth 18 of the escapement gear 14 are so close to their matching pinion 19 that the stated clockwise rotation advances the pinion 19 by an amount sufficient to advance the pinion 22, the driving gear 23 and the drum dial 24 by such amount as to advance the scales 35 and 35′ by one unit or scale count. Also similarly it is to be considered that the notch 65 of the locking ring 26 and the teeth 70 of the escapement gear 28 are in such positions relative to their respective pinions 27 and 29 that the described movement of the driving gear 23 drives the pinion 32, driving gear 34 and drum dial cylinder 37 and causes a movement thereof of such amount as to advance the scales 36 and 36′ by one unit or scale count.

It is obvious that the drum dial 12, in advancing by one unit from the digit "1" of the scale 15′, if it should continue to display the numbers of the scale 15′ would indicate the number 60, which would be in error, and would not display the correct number "0" as required at the prime meridian. Similarly it is obvious that the drum dial 24, in advancing by one unit, from the digit "0" of the scale 35′, if it should continue to display the numbers of the scale 35′ would indicate the digit "9," which would be in error, and would not display the correct number "0" as required at the prime meridian. However, if at the same time that the dials 12 and 24 are advanced the scales 15′ and 35′ be masked and the scales 15 and 35 be revealed, the correct numbers would then be displayed in the unit degree rank and in the minutes rank. This is accomplished in the following manner.

When the scales 36 and 36′ are advanced by the movement of the dial drum cylinder 37 as described above, the advancement is of the amount of one unit or scale count. Since the indication before the movement displayed the indicia W 0 of the scale 36′, a clockwise movement of one unit brings the indicia E 0 of the scale 36 into the position relative to the frame and the case formerly occupied by the indicia W 0 of the scale 36′, so that whereas the indicia W 0 appeared in the window 50, Fig. 2, of the case 45 before the movement, as indicated in Fig. 3A in the window 55, the indicia E 0 appears after the movement in the window 60 as indicated in Fig. 3B. However, because the skirt 40, Fig. 1, is mechanically a part of the cylinder 37, the described movement of the cylinder 37 upon which said scales 36 and 36′ are inscribed not only progresses the scales 36 and 36′ but also advances the skirt 40. Since the sum of the number of indicia in the scales 36 and 36′ is 36, the advancement of the cylinder 37 that is sufficient to advance the scales by one indicium is an amount of one thirty-sixth of one complete revolution, so that the transparent strip offsetting lines 75 and 80 are advanced in a clockwise direction by one thirty-sixth of one complete revolution. As a result, whereas before the movement the transparent strips 38 and 41 were behind the window 50 of the case 45, Fig. 2, after the movement the transparent strips 39 and 42, Fig. 1, are behind the window 50 of the case 45, Fig. 2. Since the transparent strip 38, Fig. 1, can reveal only the scale 35' of the dial drum 24 and the transparent strip 39 can reveal only the scale 35, the transition from the placement of the transparent strip 38 behind the window 50 of the case 45, Fig. 2, to the placement of the transparent strip 39, Fig. 1, behind the window 50 of the case 45, Fig. 2, conceals the scale 35', Fig. 1, and reveals the scale 35. This results in the digit "0" of the scale 35 being revealed as is indicated by the digit indicated at the character 63 in the window 60 of Fig. 3B. Similarly, since the transparent strip 41 can reveal only the scale 15' of the dial drum 12 and the transparent strip 42 can reveal only the scale 15, the transition from the placement of the transparent strip 41 behind the window 50 of the case 45, Fig. 2, to the placement of the transparent strip 42, Fig. 1, behind the window 50 of the case 45, Fig. 2, conceals the scale 15', Fig. 1, and reveals the scale 15. This results in the digit "0" of the scale 15 being revealed as is indicated by the digit at the character 64 in the window 60 of Fig. 3B.

Further progress of the ship toward the east by one minute of longitude advances the shaft 11, Fig. 1, clockwise and advances the dial drum 12 by one-sixtieth revolution to bring the numeral 1 of scale 15 under the window 50 of the case 45, Fig. 2, as seen through the transparent strip 42 of the skirt 46. Since this movement of the dial drum 12 involves no additional advancement of the second and third stages, the counter will read E 00° 1' and its appearance will be as indicated in Fig. 3C within the window 66.

The counter of the invention may obviously be used for other purposes than indicating longitude. For instance, latitude may be indicated without any change in the mechanism and with only a change in the tens rank of the degree scales to indicate from 0 to 90 degrees instead of from 0 to 180 degrees. In this use as in use for indicating longitude, as many sets of scales as may be desired can be set around the circumference of each stage drum dial if the driving gear ratios be changed to correspond. For instance, in Fig. 4 representing the cylinder 67, scales 56 and 56', and skirt 66 of a latitude counter, the tens scales 56 and 56', each running from 0 to 8 and 8 to 0 inclusive and each covering 90 degrees of the circumference of the cylinder 67, are in two sets covering the entire circumference, although one, three, four or more sets could be used instead, with appropriate changes in the driving gear ratio and accompanied by parallel changes in the numbers and positioning of the transparent strips.

It is desirable in indicating longitude, latitude, or bearing to indicate in the case of longitude whether it is east or west longitude, in the case of latitude to indicate whether it is north or south latitude, and to indicate, in the case of a bearing counter, the quadrant of the bearing. This object may be accomplished in several ways. The several scales may be coded in colors so that, for instance, in Fig. 1 all left-most scales, indicating west longitude, may be printed in green while the remaining scales are printed in red. Another method is to precede each of the tens scale numerals with a letter or word indicating north, south, east, or west, as the case may be. This method is illustrated in Figs. 1 and 2, in which all digits of the tens rank are shown preceded by W over half of the circumference of the third stage drum dial and along the slot 38, indicating west longitude from 180 to 0 degrees and preceded by E over the remainder of the circumference and along the transparent strip 39 indicating east longitude from 0 to 180 degrees.

Figure 4:
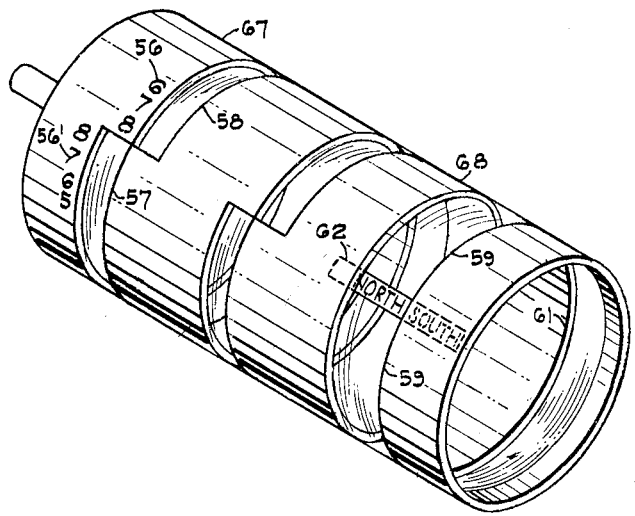
Figure 4 is an illustration of a portion of the counter mechanism of Fig. 1 adapted to indicate latitude and illustrating an alternative mechanism for hemisphere indication.
Figure 7:
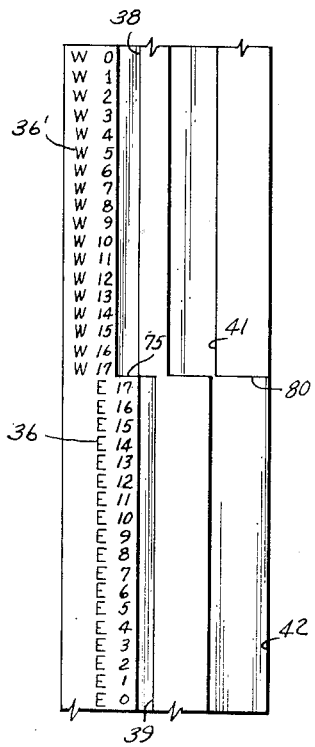
Fig. 7 is a development of the highest order scale of the device of Fig. 1.

A third and alternative method of indicating the hemisphere or quadrant is shown in Fig. 4 in which two additional semicircular slots or transparent strips 59 and 61 are added. Two words, "north" and "south" are placed on a part of the frame represented by the strap 62, so that when the slot 59 is behind the window the word "north" is exposed, and during the remaining 180° of rotation of the mask, when the slot 61 is visible through the window of the case, the word "south" is exposed and the word "north" is masked.

While the apparatus of the invention has been specifically described in relation to mechanisms for determining latitude and longitude, those skilled in the art will readily appreciate that the same mechanism may be utilized for measuring other angular quantities and non-decimal systems of counting when different indicia scales are used on the several stages.

What is claimed is:

1. A counter comprising, a shaft the units of rotation of which are to be counted, a first counter stage operatively associated with said shaft for rotation thereby, said first counter stage including an indicia member bearing a pair of indicia scales positioned adjacent each other, one of said indicator scales bearing numerical indicia increasing in one direction from zero to a first maximum and the other of said scales bearing numerical indicia increasing in the other direction from a preselected value numerically greater than zero to a second maximum which is greater than said first maximum by said preselected value, a second counter stage, transfer mechanism operatively associated with said first and second counter stages to advance said second counter stage step by step in response to predetermined rotation of said first counter stage, said second counter stage including an indicia member bearing an indicia scale the numerical value of which increases in opposite directions from a selected value, a mask integral with said second counter stage superposed over said first counter stage having offset transparent portions positioned opposite the pair of indicia scales on the indicia member of said first counter stage for rendering one or the other of said pair of indicia scales selectively visible.

2. A counter comprising, a shaft the units of rotation of which are to be counted, a first counter stage operatively associated with said shaft for rotation thereby, said first counter stage including an indicia member bearing a pair of indicia scales positioned adjacent each other, one of said indicator scales bearing numerical indicia increasing in one direction from zero to a first maximum and the other of said scales bearing numerical indicia increasing in the other direction from a preselected value numerically greater than zero to a second maximum which is greater than said first maximum by said preselected value, a second counter stage, transfer mechanism operatively associated with said first and second counter stages to advance said second counter stage step by step in response to predetermined rotation of said first counter stage, said second counter stage including an indicia member having a pair of indicia scales offset with respect to each other which increase in numerical value in opposite directions, a mask integral with the indicia member of said second counter stage superposed over the indicia member of said first counter stage, said mask including offset transparent portions positioned to overlie the indicia scales on the indicia member of said first counter stage for selectively rendering one or the other of said pair of indicia scales visible.

3. A counter comprising, a shaft the units of rotation of which are to be counted, a first counter stage connected to said shaft and rotated thereby, said first counter stage including an indicia member bearing a pair of indicia scales positioned adjacent each other, one of said indicator scales bearing numerical indicia increasing in one direction from zero to a first maximum and the other of said scales bearing numerical indicia increasing in the other direction from a preselected value numerically greater than zero to a second maximum which is greater than said first maximum by said preselected value, a second counter stage, transfer mechanism connected between said first and second counter stages for advancing said second counter stage one step in response to a predetermined rotation of said first counter stage, said second counter stage including an indicia member bearing a pair of indicia scales positioned adjacent each other the numerical values of which increase in opposite directions, a third counter stage, transfer mechanism connected between said second and third counter stages for advancing said third counter stage one step in response to a predetermined rotation of said second counter stage, said third counter stage including an indicia member bearing an indicia scale the numerical value of which increases in opposite directions from a selected value, a mask integral with said third counter stage superposed over said first and second counter stages, said mask including offset transparent portions positioned opposite the pairs of indicia scales on the indicia members of said first and second counter stages for rendering visible selected ones of said pairs of scales.

4. A counter comprising, a shaft the units of rotation of which are to be counted, a first counter stage connected to said shaft and rotated thereby, said first counter stage including an indicia member bearing a pair of indicia scales positioned adjacent each other, one of said indicator scales bearing numerical indicia increasing in one direction from zero to a first maximum and the other of said scales bearing numerical indicia increasing in the other direction from a preselected value numerically greater than zero to a second maximum which is greater than said first maximum by said preselected value, a second counter stage, a transfer mechanism connected between said first and second counter stages for advancing said second counter stage one step in response to a predetermined degree of rotation of said first counter stage, said second counter stage including an indicia member bearing a pair of indicia scales positioned adjacent each other the numerical values of which increase in opposite directions, a third counter stage, transfer mechanism connected between said second and third counter stages for advancing said third counter stage one step in response to a predetermined degree of rotation of said second counter stage, said third counter stage including an indicia member bearing a pair of indicia scales offset with respect to each other which increase in numerical value in opposite directions, a mask integral with the indicia member of said third counter stage and rotatable therewith superposed over the indicia members of said first and second counter stages, said mask including offset transparent portions positioned to overlie the indicia scales of said first and second counter stages for selectively rendering visible selected ones of said pairs of scales.

5. A counter comprising, a shaft the units of rotation of which are to be counted, a first counter stage including a drum operatively associated with said shaft for rotation thereby, a pair of indicia scales positioned contiguous to each other and around the periphery of said drum the numerical value of one of said pair of scales increasing in a clockwise direction from zero to a first maximum value and the numerical value of the other of said scales increasing in a counterclockwise direction from a preselected numerical value greater than zero to a second maximum value which exceeds said first maximum value by said preselected numerical value, a second counter stage, transfer mechanism operatively associated with said first and second counter stages to advance said second counter stage step by step in response to predetermined rotation of said first counter stage, said second counter stage including a drum having an indicia scale inscribed around the periphery thereof, the numerical value of said last mentioned indicia scale increasing from a predetermined minimum value in both a clockwise and counterclockwise direction, the drum of said second counter stage including a hollow cylindrical mask rotatable therewith, said mask surrounding the drum of said first counter stage and having offset transparent portions extending partially around the circumference of said mask, said transparent portions being aligned with the pair of indicia scales of said first counter stage drum whereby one or the other of said pair of scales is rendered visible as said mask and second counter stage rotate.

6. A counter comprising, a shaft the units of rotation of which are to be counted, a first counter stage drum connected to and rotated by said shaft, a pair of indicia scales inscribed around the surface of said first counter stage drum in side by side relation, the numerical value of one of said pair of indicia scales increasing in a clockwise direction from zero to a first maximum value and the numerical value of the other of said scales increasing in a counterclockwise direction from a preselected numerical value greater than zero to a second maximum value which exceeds said first maximum value by said preselected numerical value, a second counter stage drum, a transfer mechanism connected between said first and second counter drums for advancing said second counter stage drum one step in response to a predetermined degree of rotation of said first counter stage drum, said second counter stage drum having a pair of indicia scales inscribed around its surface in side by side relation, the numerical value of one of said last mentioned pair of indicia scales increasing in a clockwise direction and the numerical value of the other of said last mentioned pair of indicia scales increasing in a counterclockwise direction, a third counter stage drum, a transfer mechanism connected between said second and third counter stage drums for advancing said third counter stage drum one step in response to a predetermined degree of rotation of said second counter stage drum, said third counter stage drum having a pair of indicia scales each extending partially around the surface thereof and offset laterally with respect to each other, the numerical value of said pair of scales increasing in opposite directions from a common axial line of juncture, a hollow cylindrical mask integral and rotatable with said third counter stage drum, said mask surrounding said first and second counter stage drums and having pairs of offset transparent portions each of the individual ones of said respective pairs of which extend partially around the surface of said mask, said respective pairs of transparent portions being aligned with the respective pairs of indicia scales of said first and second counter stage drums whereby one or the other of said pairs of scales are rendered visible as said third counter stage drum is rotated.

7. A counter for indicating geographical angular coordinate and hemisphere of location comprising, a first drum carrying a pair of adjacent scale designations corresponding to minutes of angle, one of said pair of scale designations increasing around the periphery of said first drum in one direction of rotation from zero to a first numerical value while the other of said pair of scale designations decreases around the periphery of said first drum in said one direction of rotation from a second maximum value greater than said first maximum value by a preselected amount to a minimum value numerically greater than zero by said preselected amount, a second drum carrying a pair of adjacent scale designations corresponding to units of degrees of angle, one of said last mentioned pair of scale designations increasing around the periphery of said second drum in one direction of rotation while the other of said last mentioned pair of scale designations decreases around the periphery of said second drum in said direction of rotation, a third drum carrying scale designations corresponding to tens of degrees of angle, the scale designations on said third drum increasing from zero at a point corresponding to a division of hemisphere in opposite directions of rotation around the periphery of said third drum, said third drum additionally including designations of hemisphere of location, a hollow cylindrical mask formed integral with said third drum having two pairs of offset peripherally extending transparent portions, said mask surrounding and enclosing said first and second drums and said transparent portions being so positioned on said mask and as respects the scale designations on said first and second drums that only one or the other of respective ones of said pairs of scale designations are rendered visible at any one time.

FRANK P. GOLDBACH.

References Cited in the file of this patent

UNITED STATES PATENTS

| Number | Name | Date |
|---|---|---|
| 1,439,097 | Graham | Dec. 19, 1922 |
| 1,542,465 | Macgill | June 16, 1925 |
| 1,702,403 | Holmes | Feb. 19, 1929 |
| 2,260,541 | Schwenn | Oct. 28, 1941 |
| 2,463,594 | Brigham | Mar. 8, 1949 |

FOREIGN PATENTS

| Number | Country | Date |
|---|---|---|
| 15,256 | Great Britain | 1906 |